US011716284B2

(12) United States Patent
Jain et al.

(10) Patent No.: US 11,716,284 B2
(45) Date of Patent: Aug. 1, 2023

(54) GROUP BASED CLASSIFICATION AND POLICY ENFORCEMENT FOR EXTERNAL NETWORK TRAFFIC

(71) Applicant: Cisco Technology, Inc., San Jose, CA (US)

(72) Inventors: Prakash C. Jain, Fremont, CA (US); Sanjay Kumar Hooda, Pleasanton, CA (US); Darrin Joseph Miller, Marysville, OH (US); Ashwin Kumar, Bengaluru (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/308,224

(22) Filed: May 5, 2021

(65) Prior Publication Data
US 2022/0360528 A1 Nov. 10, 2022

(51) Int. Cl.
*H04L 12/741* (2013.01)
*H04L 45/74* (2022.01)
*H04L 9/40* (2022.01)

(52) U.S. Cl.
CPC ............ *H04L 45/74* (2013.01); *H04L 63/205* (2013.01)

(58) Field of Classification Search
CPC ............ H04L 12/4633; H04L 2212/00; H04L 45/742; H04L 61/103; H04L 61/2592; H04L 61/5084
See application file for complete search history.

(56) References Cited

U.S. PATENT DOCUMENTS

| | | |
|---|---|---|
| 2012/0314714 A1 | 12/2012 | Hu et al. |
| 2018/0367302 A1* | 12/2018 | Kondalam ............ H04L 9/0841 |
| 2018/0367337 A1 | 12/2018 | Jain et al. |
| 2019/0342215 A1* | 11/2019 | Jain ........................ H04L 45/742 |
| 2020/0136862 A1 | 4/2020 | Jain et al. |
| 2020/0245206 A1 | 7/2020 | Allan |

OTHER PUBLICATIONS

Farinacci, D., et al., "The Locator/ID Separation Protocol (LISP)," Internet Engineering Task Force (IETF), Request for Comments: 6830, ISSN: 2070-1721, Jan. 2013, 75 pages.

* cited by examiner

*Primary Examiner* — Mansour Oveissi
*Assistant Examiner* — David M Oveissi
(74) *Attorney, Agent, or Firm* — Lee & Hayes, P.C.

(57) ABSTRACT

Techniques for group-based classification and policy enforcement at a network fabric edge for traffic that is being sent to external network destinations are disclosed herein. The techniques may include receiving, at a control plane of a network and from an edge node of the network, a request to provide mapping data associated with sending a packet to a destination. Based at least in part on an address prefix value associated with the destination, the control plane may determine that the destination is located in an external network. Additionally, a group identifier that is associated with the destination may be determined. In this way, an indication of the group identifier may be sent to the edge node such that the edge node may determine, based at least in part on the group identifier, a policy decision for routing the packet to the external network.

20 Claims, 10 Drawing Sheets

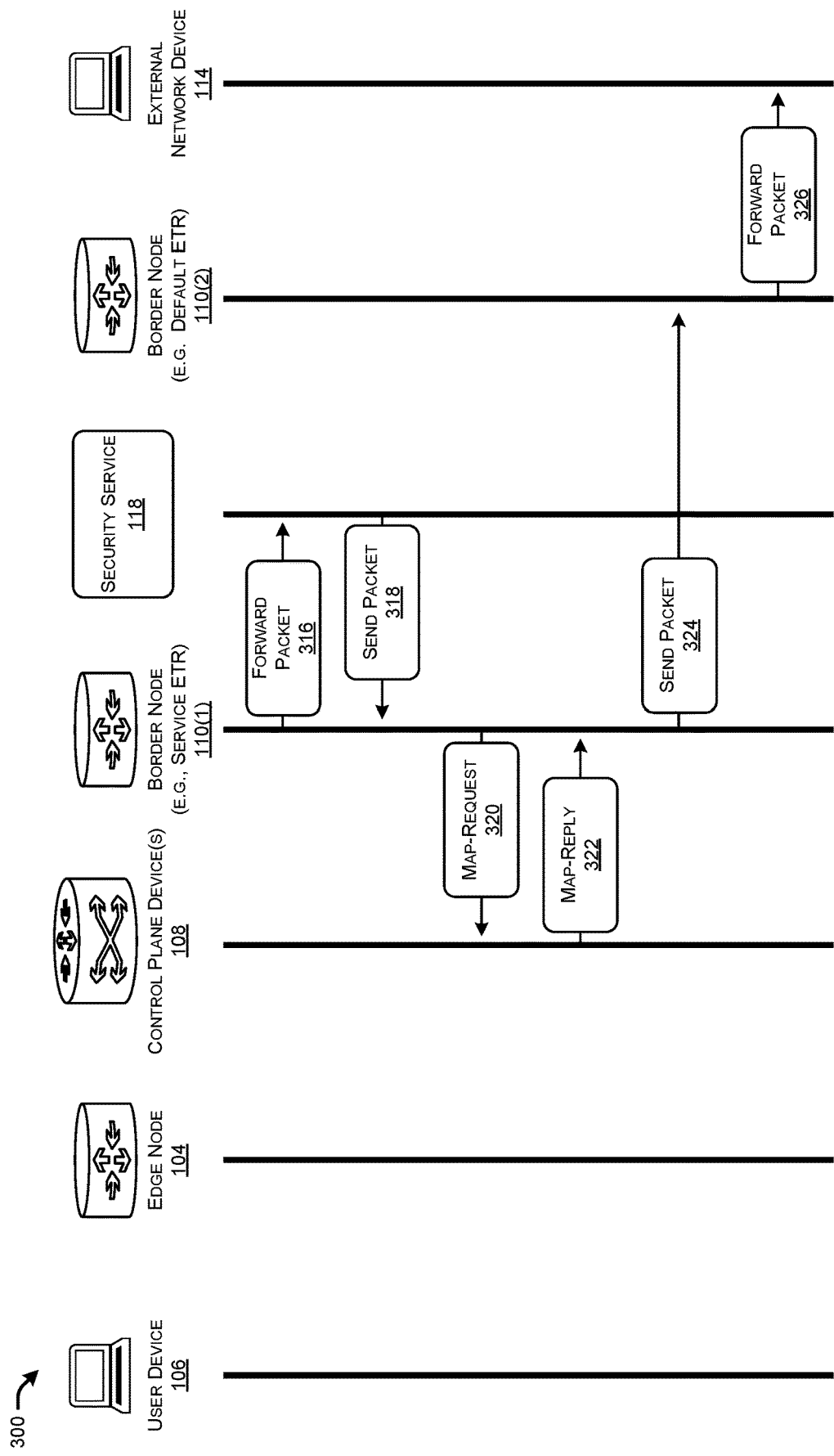

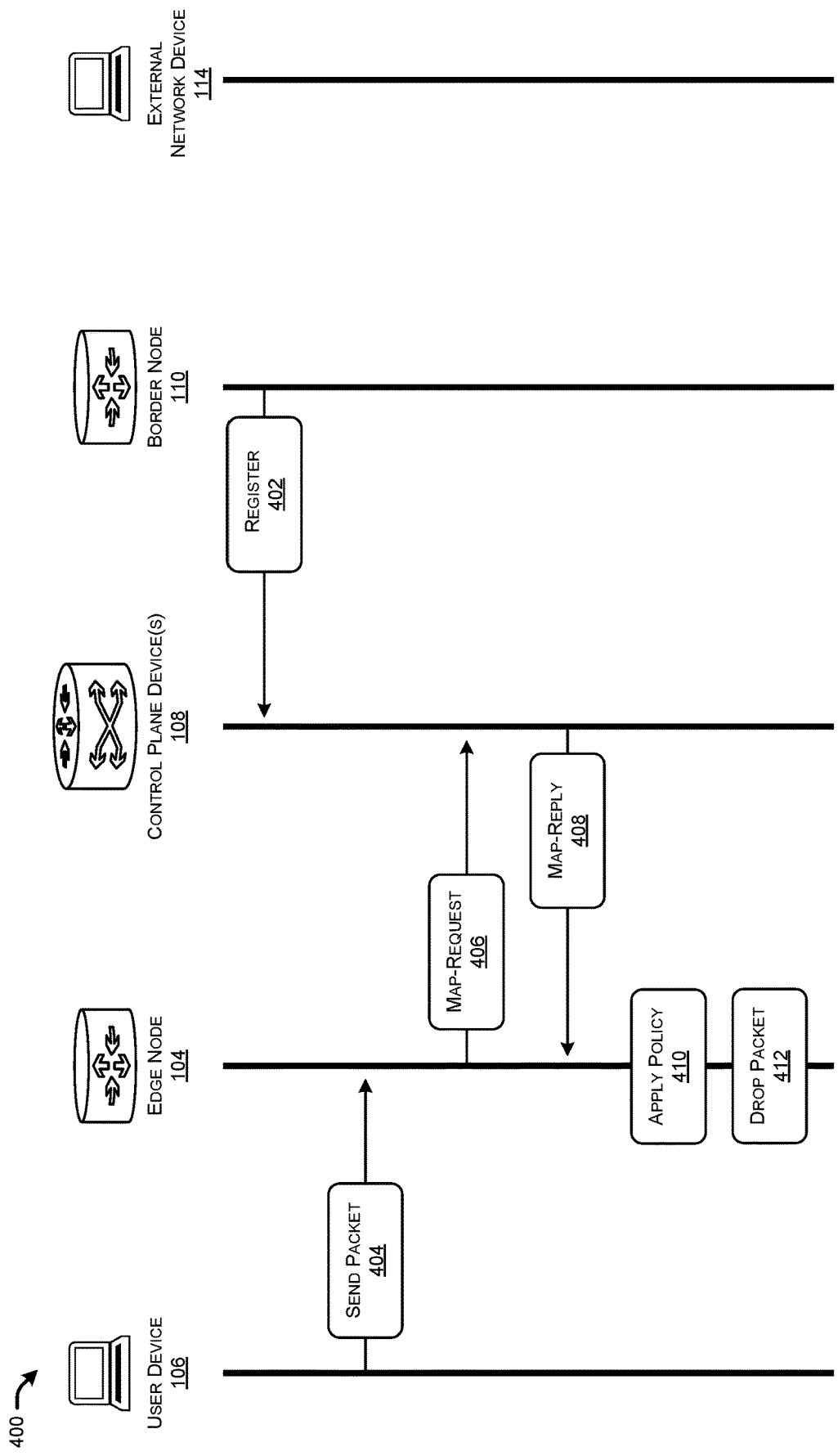

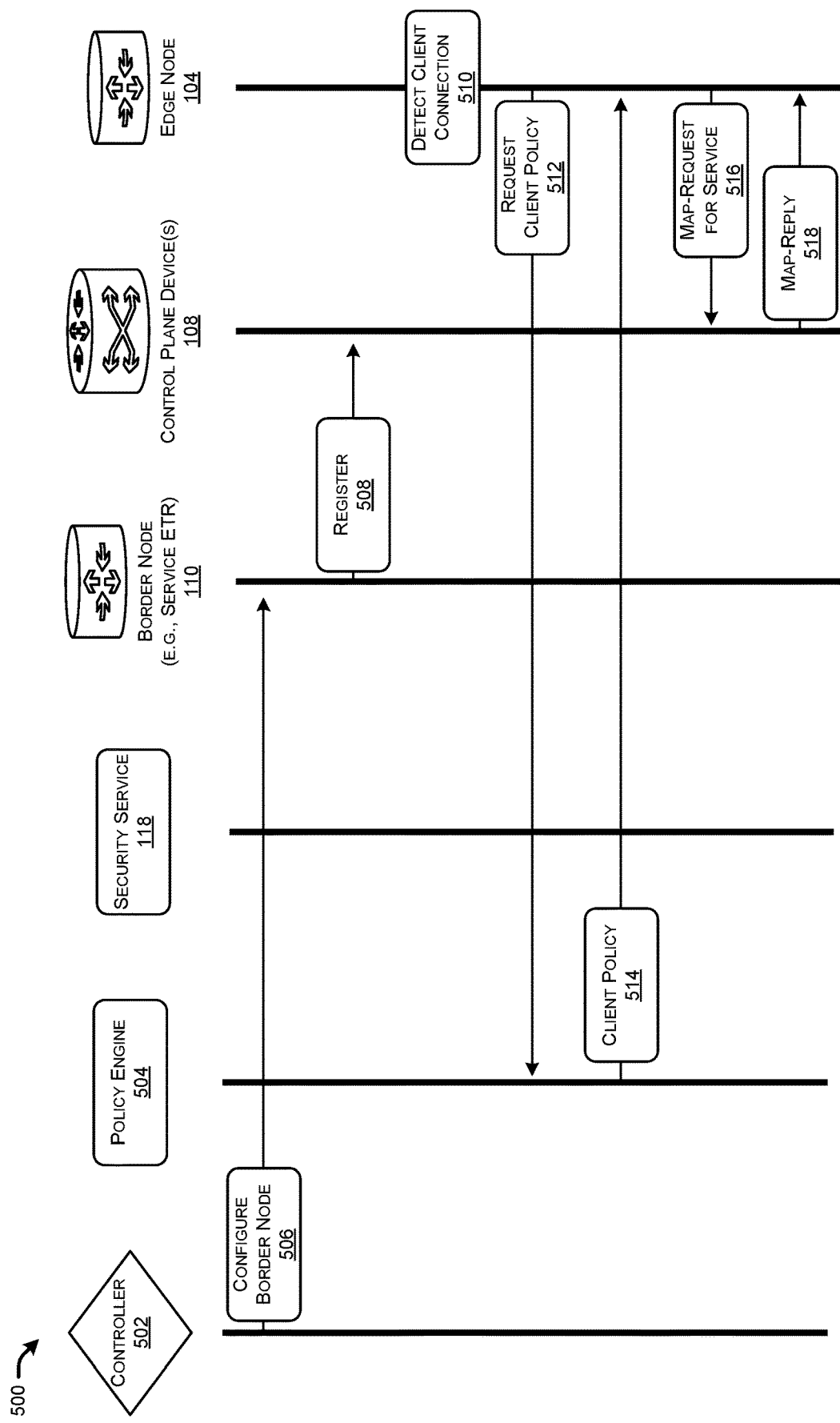

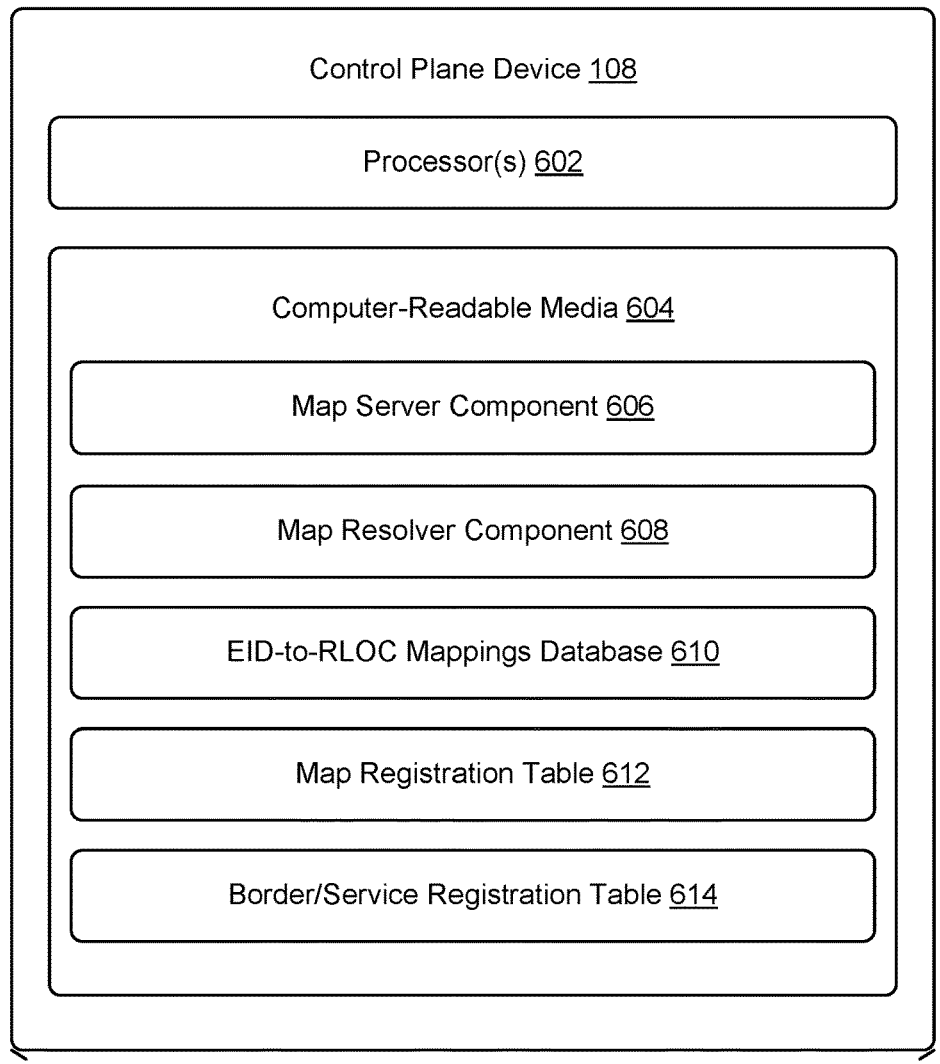
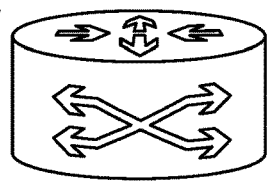
FIG. 6

800 ⤵

```
┌─────────────────────────────────────────────────────────────────┐
│  RECEIVE, AT A CONTROL PLANE OF A NETWORK AND FROM AN EDGE NODE │
│  OF THE NETWORK, A REQUEST TO PROVIDE MAPPING DATA ASSOCIATED   │
│  WITH SENDING A PACKET TO A DESTINATION, THE REQUEST INCLUDING  │
│  AN ADDRESS PREFIX VALUE THAT IS ASSOCIATED WITH THE DESTINATION│
│                              802                                │
└─────────────────────────────────────────────────────────────────┘
                              │
                              ▼
┌─────────────────────────────────────────────────────────────────┐
│  DETERMINE, AT THE CONTROL PLANE AND BASED AT LEAST IN PART ON  │
│  THE ADDRESS PREFIX VALUE, THAT THE DESTINATION IS LOCATED IN   │
│                       AN EXTERNAL NETWORK                       │
│                              804                                │
└─────────────────────────────────────────────────────────────────┘
                              │
                              ▼
┌─────────────────────────────────────────────────────────────────┐
│  DETERMINE A GROUP IDENTIFIER THAT IS ASSOCIATED WITH A BORDER  │
│  NODE OF THE NETWORK, THE GROUP IDENTIFIER INDICATING THAT THE  │
│  DESTINATION IS LOCATED IN THE EXTERNAL NETWORK, THE BORDER     │
│  NODE CONFIGURED TO ROUTE TRAFFIC BETWEEN THE NETWORK AND THE   │
│                         EXTERNAL NETWORK                        │
│                              806                                │
└─────────────────────────────────────────────────────────────────┘
                              │
                              ▼
┌─────────────────────────────────────────────────────────────────┐
│  BASED AT LEAST IN PART ON DETERMINING THAT THE DESTINATION IS  │
│  LOCATED IN THE EXTERNAL NETWORK, SENDING AN INDICATION OF THE  │
│  GROUP IDENTIFIER TO THE EDGE NODE SUCH THAT THE EDGE NODE      │
│  DETERMINES, BASED AT LEAST IN PART ON THE GROUP IDENTIFIER, A  │
│         POLICY DECISION FOR ROUTING THE PACKET                  │
│                              808                                │
└─────────────────────────────────────────────────────────────────┘
```

FIG. 8

GROUP BASED CLASSIFICATION AND POLICY ENFORCEMENT FOR EXTERNAL NETWORK TRAFFIC

TECHNICAL FIELD

The present disclosure relates generally to improved techniques that, among other things, allow for group-based classification and policy enforcement at a network edge for traffic that is being sent to external network destinations.

BACKGROUND

In network fabrics, security group tags can be used for segmentation and security policy enforcement to allow or deny access to different services, as well as to allow or deny communication across different groups. For traffic that is being sent to local, fabric destinations, as well as for traffic being sent to external destinations, it can be preferable to make classification and policy decisions at the ingress fabric edge as soon as traffic enters the network fabric. This can help avoid and decrease the chances of traffic leakage, security breaches, or attacks.

In general, making group-based classification and policy enforcement decisions at the ingress fabric edge for destinations which are local and/or known to the network fabric has been done by provisioning, learning, and/or downloading the Internet Protocol address to Security Group Tag bindings (IP-SGT bindings) from a security/policy engine. This has been largely due to the fact that the local IP address prefixes are known, preconfigured prefixes with a security group tag assigned via IP-SGT bindings.

However, external network destinations cannot be preconfigured and cannot be preassigned with a security group tag. Hence, all internet destinations are categorized by default as having an unknown destination group tag and, as a result, cannot be treated similar to known fabric destinations for group-based classification and policy enforcement perspectives at the fabric edge. This problem becomes increasingly more difficult at the fabric edge upon ingress, because when traffic arrives at the fabric edge, there is no easy way in forwarding to determine if a destination is located in an external network or within the fabric for which a next hop and DGT is not yet available.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 3A and 3B are data flow diagrams that collectively illustrate another example traffic flow in which a group-based classification and policy decision is made in order to send a packet, via a security service, to an external network device that is located in an external network.

FIG. 4 is a data flow diagram illustrating yet another example traffic flow in which a group-based classification and policy decision is made for a packet and, in response, the packet is dropped and not sent to an external network device.

FIG. 5 is a data flow diagram illustrating an example traffic flow that may be performed in addition to the example traffic flows described in FIGS. 2-4, as well as other traffic flows described in this disclosure.

FIG. 6 is a block diagram illustrating example detail of an example control plane device.

FIG. 8 is a logic flow diagram illustrating an example method for making group-based classification and policy decisions associated with sending packets to external destinations.

DESCRIPTION OF EXAMPLE EMBODIMENTS

Overview

Figure 1:
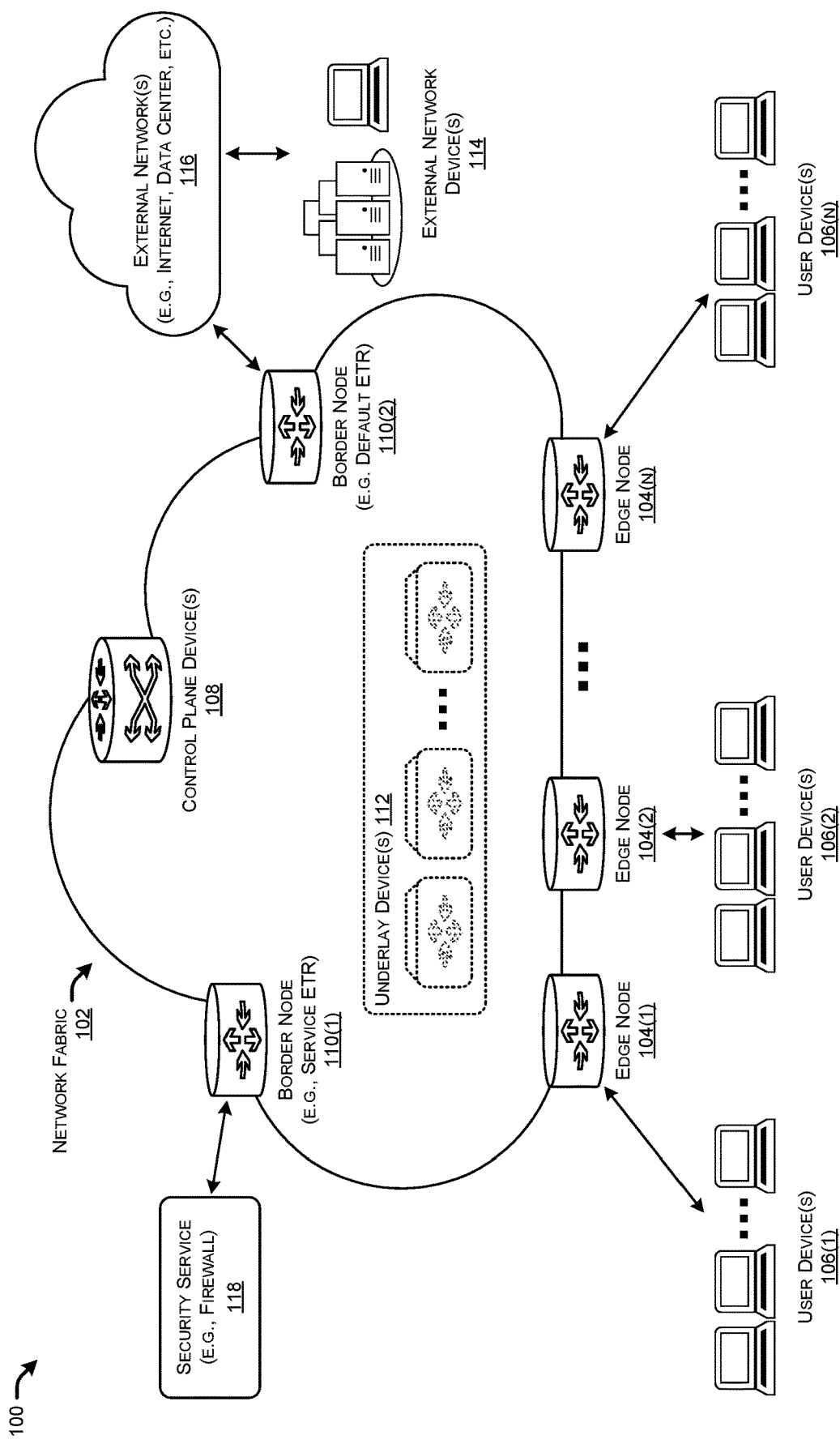
FIG. 1 illustrates a schematic view of an example system-architecture that includes an example network fabric in which traffic may be routed according to group-based policy decisions.

This disclosure describes systems and methods that, among other things, allow for group-based classification and policy enforcement at a network edge for traffic that is being sent to external network destinations. By way of example, and not limitation, a method according to the various techniques described in this disclosure may include receiving, at a control plane of a network and from an edge node of the network, a request to provide mapping data associated with sending a packet to a destination, the request including an address prefix value that is associated with the destination. Based at least in part on the address prefix value, the control plane may determine that the destination is located in an external network. The control plane may also determine a group identifier that is associated with a border node of the network that is configured to route traffic between the network and the external network. Additionally, the group identifier may indicate that the destination is located in the external network. Based at least in part on determining that the destination is located in the external network, the control plane may send an indication of the group identifier to the edge node such that the edge node determines, based at least in part on the group identifier, a policy decision for routing the packet.

Additionally, the techniques described herein may be performed as a method and/or by a system or device having non-transitory computer-readable media storing computer-executable instructions that, when executed by one or more processors, performs the techniques described herein.

Example Embodiments

As discussed above, in network fabrics, security group tags can be used for segmentation and security policy enforcement to allow or deny access to different services, as well as to allow or deny communication across different groups. It is preferable to make classification and policy decisions at the ingress fabric edge as soon as traffic enters the network fabric, as this can help avoid and decrease the chances of traffic leakage, security breaches, or attacks.

However, because external network destinations (e.g., internet destinations, external data center destinations, etc.) cannot be preconfigured and cannot be preassigned with a security group tag, all internet destinations are categorized by default as having an unknown destination group tag. As a result, external network destinations cannot be treated similar to known fabric destinations for group-based classification and policy enforcement perspectives at the fabric edge. Furthermore, there is no easy way in forwarding to determine if a destination is located in an external network or within the fabric for which a next hop and DGT is not yet available, adding another layer of complexity to the problem.

With these and other challenges in mind, this disclosure describes techniques for solving the above problem so that external traffic can be assigned an appropriate group tag and then can be treated for group-based classification and group-based steering policy application in the same way as any local network fabric destinations at the fabric edge upon ingress. For instance, the techniques described herein may, in some examples, incorporate an enhanced Locator/Identifier Separation Protocol (LISP) method of border registration. The enhanced LISP method of border registration may include identifying or provisioning a border with an egress tunnel router (ETR) type (e.g., default ETR, service ETR, etc.). Additionally, during registration a security group tag may also be provisioned at the border and assigned to external traffic (e.g., for a default ETR, a security group tag may be assigned to 0/0 prefixes) or external traffic specific to a service (e.g., for a service ETR, a security group tag may be assigned to a service like firewall.host.com, dhcp.host.com, or dns.host.com). Alternatively, or additionally, the security group tag may be provisioned at a security/policy engine of the network fabric and downloaded to the border. In any of these ways, when a default ETR or service ETR is registered to a control plane (e.g., LISP map-server node) of the network fabric using this enhanced LISP method of border registration, the security group tag for the external traffic (e.g., internet traffic or service specific traffic) may also be registered at the control plane and stored in a border/service registration table.

Based at least in part on the enhanced LISP method of border registration described above, when a packet arrives at the fabric edge and a LISP "map-request" message is sent to one or more control plane devices (e.g., LISP map-resolver node), the control plane device may access a map registration table to search for the destination prefix in order to determine whether (i) the destination is a local fabric destination; (ii) the destination is a specific service; or (iii) the destination is an internet destination. Based on this determination, the control plane device may retrieve the security group tag for the destination. For instance, if the destination is a local fabric destination, the control plane device may retrieve the security group tag from the map registration table, which contains IP address prefix to security group tag bindings (IP-to-SGT bindings). Alternatively, if the destination is an external destination (e.g., internet or specific service), then the control plane device may retrieve the security group tag from the border/service registration table, which, in contrast to the map registration table, is not specific to an IP address prefix but specific to a service or the internet.

According to these techniques, the control plane device may send a LISP "map-reply" which includes a destination group tag in all different cases of data triggers, including not only triggers from local, known fabric destinations, but triggers from external traffic destinations as well. For instance, a map-reply for a local, known fabric destination prefix gets a destination group tag from the map registration table while a service name specific map-reply or an external destination map-reply resulting in a negative map reply (NMR) "hole" prefix gets a destination group tag from the border/service registration table). In this way, the act of assigning a destination group tag to the NMR hole allows the fabric edge to apply the policy to the external destinations.

The technologies described herein make the forwarding of traffic/packets simpler at the fabric edge since security group tag/destination group tag-based steering policies can be applied for all destinations, irrespective of whether the destination is a local, known fabric destination or an external (e.g., internet, data center, service, etc.) destination. This results in a uniform way to apply policies at the fabric edge, thus improving the operation of computing devices by saving on expensive hardware generally needed for individual destinations since the NMR hole, and assignment of security group tag to it, allows the policy for the external, unknown destinations to be applied at the fabric edge. Additionally, the NMR hole entry may install the security group tag with it (e.g., in FIB), which may then be used in making policy decisions.

By way of example, and not limitation, a method according to the various techniques disclosed herein may include receiving, at a control plane of a network and from an edge node of the network, a request to provide mapping data associated with sending a packet to a destination. In some examples, the request may include an indication of an address prefix value of the destination. Additionally, the request to provide mapping data may comprise a LISP map-request, and the request may be received by a LISP map-server node of the control plane.

In some examples, the control plane may determine that the destination is located in an external network that is different than the network. Additionally, determining that the destination is located in the external network may be based at least in part on the address prefix value included in the request. For instance, the control plane may store mapping data, and the mapping data may include multiple local, known fabric IP address prefix values associated with registered user devices of the network fabric. Additionally, the mapping data may include, for each local, known fabric IP address prefix value of the multiple local, known fabric IP address prefix values, an associated edge node of the network fabric. That is, the mapping data may include EID-to-RLOC mappings (endpoint identifier to router locator mappings). As such, determining that the destination is located in the external network may, in some examples, be based at least in part on the stored mapping data. For instance, an absence of the address prefix value of the destination may be an indication that the destination is not a local, known fabric destination but, rather, an external network destination (e.g., an internet destination) corresponding with a negative map reply (NMR) hole.

In various examples, the method may include determining a group identifier that is associated with a border node of the network. The border node may be configured to route traffic between the network and the external network. Additionally, the group identifier may indicate that the destination is located in the external network, that the packet comprises external network traffic, that the packet is to be sent to the internet, and/or the like. In some examples, border node may send a registration request to the control plane or otherwise register itself with the control plane. During this registration, the border node may send an indication to the service control plane of a configuration associated with the border node.

The configuration may indicate whether the border node is a default ETR, a service ETR, another configuration of an ETR, an ingress tunnel router, and/or the like. Additionally, in some instances the border node may send an indication of the group identifier to the control plane during registration.

As noted above, the control plane may determine that the destination is located in the external network. As such, in some examples the method may include sending an indication of the group identifier to the edge node based at least in part on determining that the destination is located in the external network. In this way, the edge node may determine a policy decision for routing the packet, based at least in part on the group identifier. For instance, the edge node may receive policy information from a policy engine of the network, and the policy decision may be determined based on that policy information, as well as the group identifier. In some examples, the group identifier may comprise a security group tag and/or a destination group tag. Additionally, in some examples, sending the indication of the group identifier to the edge node may further comprise sending a router identifier that is associated with the border node. In other words, the router identifier may indicate that the border node is configured to route packets to the destination, and in order to send packets to the destination, the packets must be sent through the border node.

In some examples, determining the policy decision for routing the packet may include determining by the edge node to drop the packet. For example, the local, known fabric destination (e.g., the client device or the user of the client device that is trying to send the packet to the external destination) may not be authorized or otherwise have permission to send the packet to the destination, and the policy data may indicate this. In some examples, determining the policy decision for routing the packet may include determining by the edge node to send the packet to the destination by sending the packet directly to the border node such that the border node can route the packet to the destination. For instance, the policy data may indicate that a user who sent the packet is of a user group that is authorized to communicate directly with any destination of the external network, and determining to send the packet directly to the border node may be based at least in part on this policy data. Additionally, or alternatively, determining the policy decision for routing the packet may include determining by the edge node to send the packet to the destination by sending the packet to the destination via a security service (e.g., firewall, cloud-delivered firewall, etc.). For instance, the policy data may indicate that a user who sent the packet is of a user group that is authorized to communicate with any destination of the external network so long as the packet is routed through a firewall. In some examples, the group identifier may be cached by the edge node in a memory accessible to the edge node for a predetermined period of time. In this way, the edge node may continue to make classification and policy/steering decisions at the fabric edge for subsequent packets destined to the external destination without having to send a LISP map-request to the control plane.

Certain implementations and embodiments of the disclosure will now be described more fully below with reference to the accompanying figures, in which various aspects are shown. However, the various aspects may be implemented in many different forms and should not be construed as limited to the implementations set forth herein. For instance, while several of the exemplary figures are illustrated and described with respect to using a LISP protocol, it is contemplated that the techniques described herein are applicable to other communication protocols as well. That is, this disclosure encompasses variations of the embodiments, as described herein. In the figures described below, like numbers refer to like elements throughout.

FIG. 1 illustrates a schematic view of an example system-architecture 100 that includes an example network fabric 102 in which traffic may be routed according to group-based policy decisions. The network fabric 102 includes one or more edge nodes 104(1)-104(N) (hereinafter referred to collectively as "edge nodes 104") that provide one or more user devices 106(1)-106(N) (hereinafter referred to collectively as "user devices 106") with connectivity to the network fabric 102 (where N represents any number greater than or equal to one). The network fabric 102 may also include one or more control plane devices 108, any number of border nodes, such as border nodes 110(1) and 110(2), and one or more underlay devices 112. The nodes of the network fabric 102, such as the edge nodes 104, the control plane devices 108, and the border nodes 110 may, in some examples, send traffic to one another via one or more connections that are facilitated using the underlay devices 112 of the network fabric 102.

The edge nodes 104 of the network fabric 102 may receive traffic from the user devices 106 and, for individual packets of the traffic, make group-based policy decisions to determine whether a specific user device is allowed to send traffic to a specific destination and, if so, under what circumstances. For instance, if a first user device of the user devices 106(1) wishes to send traffic to a second user device of the user devices 106(2) and/or to one of the external network devices 114 of the external networks 116, then the edge node 104(1) may determine whether the first user device is authorized to do so. By way of example, and not limitation, the edge node 104(1) may store policy data associated with the first user device. The policy data may include a security group tag that is assigned to the first user device and/or a respective user of the first user device. The policy data may further indicate one or more security group tags assigned to one or more other devices that the first user device is authorized to communicate with, as well as under what circumstances the first user device is authorized to communicate with those one or more other devices. Additionally, the edge node 104(1) may receive the policy data from a policy engine of the network fabric.

In some examples, in response to receiving a packet from the first user device of the user devices 106(1) the edge node 104(1) may send a LISP map-request to the one or more control plane devices 108 (e.g., a map resolver component of the control plane device(s) 108). The map-request may include an indication of an address prefix of a destination where the packet is to be sent. For instance, the address prefix may correspond with one of the external network devices 114, one of the user devices 106(2) or 106(N), and/or the like.

In response to receiving the map-request from the edge node 104(1), the control plane device(s) 108 may determine whether the address prefix corresponds with (i) a local, known user device of the network fabric 102, (ii) an external network device, or (iii) a specific service, such as the security service 118. After determining a destination that the address prefix corresponds with, the control plane device(s) 108 may send a map-reply message to the edge node 104(1). The map-reply message may indicate a routing locator value associated with, for instance, one of the edge nodes 104 or one of the border nodes 110(1) or 110(2). This indication of the routing locator, in effect, indicates which specific node that the destination is located "behind." Additionally, or alternatively, the map-reply message may indicate a security group tag that is assigned to the destination device. For instance, if the destination device is an external network device 114 that is located at an internet destination such that the address prefix of the destination device is not registered or known by the control plane device(s) 108, then the control plane device(s) 108 may assign a security group tag to the address prefix that is associated with internet and/or external destinations, and that security group tag may be included in the map-reply message. In this way, when the edge node 104(1) receives the map-reply message, the edge node 104(1) may make a policy/steering decision based on the security group tag of the destination device.

As noted above, the control plane device(s) 108 of the network fabric 102 may store or otherwise have access to mapping data associated with the network fabric 102. For instance, the control plane device(s) 108 may store one or more endpoint identifier-to-routing locator (EID-to-RLOC) mappings. In some examples, an endpoint identifier (EID) may comprise an address prefix value associated with one or more user devices 106 of the network fabric. Additionally, a routing locator (RLOC) may comprise an IP address value corresponding with a specific edge node 104 or border node 110. In this way, for each one of the EIDs that is stored by the control plane device(s) 108, a respective RLOC is also stored by the control plane device(s) 108 and associated with the EID. In some examples, the mapping data may also include one or more security group tag to EID bindings (SGT-to-EID bindings). A specific SGT-to-EID binding may indicate a specific security group tag that is assigned to a specific EID. Additionally, in some examples, the control plane device(s) 108 of the network fabric 102 may store or otherwise have access to a border/service registration table. The border/service registration table may include indications of specific security group tags that are assigned to specific services (e.g., firewalls, security services, etc.), as well as security group tags that are assigned to specific border nodes. For instance, a border node, such as border node 110(2) that is configured as a default egress tunnel router (ETR), may register a security group tag that is to be assigned by the control plane device(s) 108 to any traffic that is to be sent to destinations beyond the border node 110(2), such as the one or more external network devices 114. In this way, because the EID values of the one or more external network devices 114 would not be known by the control plane device(s) 108, the security group tag that is assigned to the traffic sent to these destinations can be described as being assigned to a negative map reply (NMR) "hole." Additional detail of the control plane device(s) 108 will be further described below with reference to FIG. 6.

In some examples, the border nodes 110 may register to the control plane device(s) 108. For instance, the border node 110(1) may register to the control plane device(s) 108 that the border node 110(1) is configured as a service ETR. While registering to the control plane device(s) 108, the border node 110(1) may register one or more address prefix values or EIDs that are assigned to devices of the security service 118. Additionally, the border node 110(1) may register a security group tag with the control plane device(s) 108 that is to be associated with those address prefix values or EIDs. In some instances, the security service 118 may comprise a firewall, a cloud-delivered firewall, or another type of service. Additionally, although shown in FIG. 1 as a separate entity from the border node 110(1), it is to be appreciated that the security service 118 may be located on the border node 110(1) itself.

In a similar fashion to that described above with respect to the border node 110(1), the border node 110(2) may register with the control plane device(s) 108 as a default ETR. Additionally, the border node 110(2) may register a security group tag with the control plane device(s) 108 that is to be assigned to all traffic that is sent through the border node 110(2) (e.g., internet traffic, external data center traffic, etc.).

Figure 2:
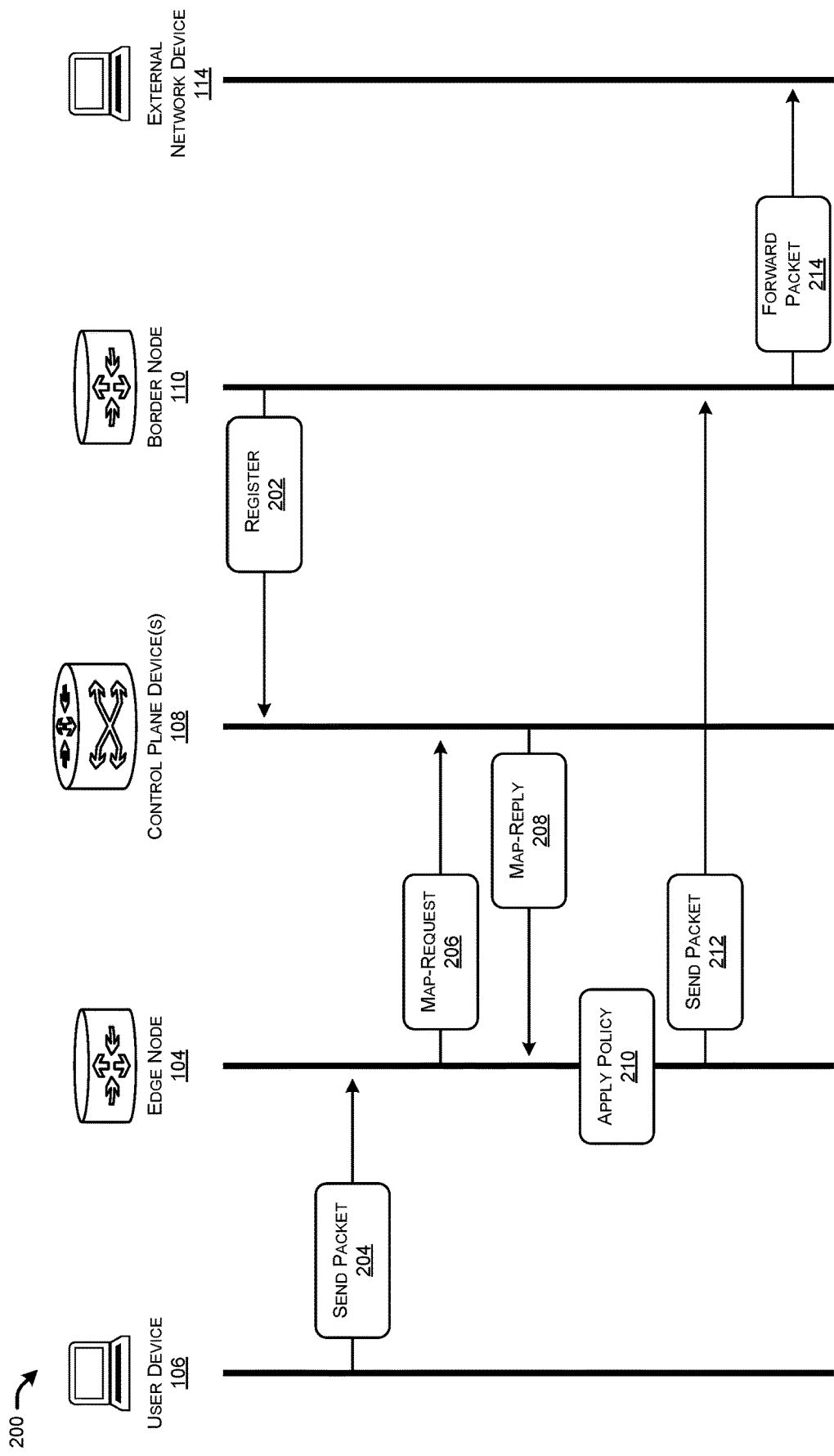
FIG. 2 is a data flow diagram illustrating an example traffic flow in which a group-based classification and policy decision is made in order to send a packet directly to an external network device that is located in an external network.

FIG. 2 is a data flow diagram illustrating an example traffic flow 200 in which a group-based classification and policy decision is made in order to send a packet directly to an external network device 114 that is located in an external network (e.g., the external network 116). At 202, the border node 110 may register with the control plane device(s) 108. For instance, the border node 110 may register with the control plane device(s) 108 as a default ETR or a service ETR. Additionally, the border node 110 may register a security group tag with the control plane device(s) 108 (e.g., with a LISP map-sever component of the control plane device(s) 108) that is to be assigned to any traffic sent through the border node 110.

At 204, the user device 106 may send a packet to the edge node 104. The packet may include an address prefix value associated with the external network device 114 and/or an external network in which the external network device 114 is located. At 206, based at least in part on receiving the packet, the edge node 104 may send a map-request message (e.g., a LISP protocol map-request) to the control plane device(s) 108 (e.g., to a LISP map-resolver component of the control plane device(s) 108). The map-request message may include an indication of the address prefix value of the external network device 114 to which the packet is to be sent.

Based at least in part on receiving the map-request message, at 208, the control plane device(s) 108 (e.g., the LISP map-resolver component of the control plane device(s) 108) may send a map-reply message (e.g., LISP map-reply message) to the edge node 104. The map-reply message may indicate a routing locator identifier associated with the border node 110. Additionally, the map-reply message may indicate a security group tag that is associated with the border node 110 and/or the external network device 114. For instance, if the external network device 114 is an internet destination, the address prefix value will not be known by the control plane device(s) 108. However, instead of returning a negative map reply (NMR) message to the edge node 104 indicating that the address prefix is unknown, the control plane may determine that the address prefix value corresponds to an internet destination behind the border node 110 and, accordingly, assign the security group tag to the address prefix value that is part of the NMR "hole."

At 210, based at least in part on the security group tag included in the map-reply from the control plane, the edge node 104 may apply a group-based steering policy in order to determine whether the user device 106 is authorized to send the packet to the external network device and, if so, under what conditions. For instance, the edge node 104 may apply the policy to determine (i) whether to immediately drop the packet at the fabric edge node 104, (ii) whether to send the packet directly to the external network destination 114, or (iii) whether to send the packet to the external network destination 114 via a firewall or other security service. At 212, based at least in part on applying the policy, the edge node 104 may send the packet directly to the external network device 114 by sending the packet to the border node 110. And the border node 110, at 214, may forward the packet to the external network device 114.

Figure 3A:
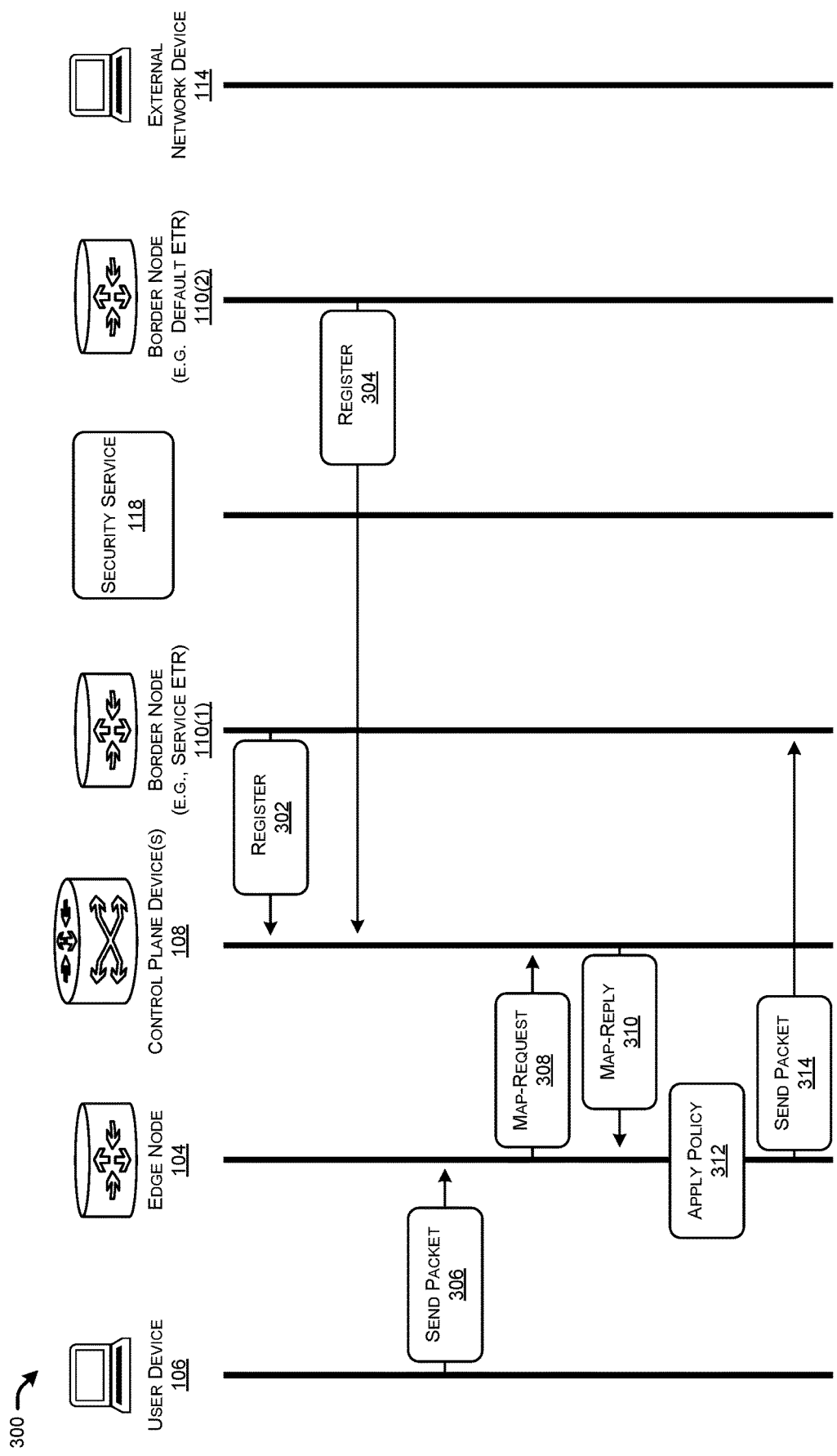

FIGS. 3A and 3B are data flow diagrams that collectively illustrate another example traffic flow 300 in which a group-based classification and policy decision is made in order to send a packet, via a security service 118, to an external network device 114 that is located in an external network (e.g., external network 116). At 302, the border node 110(1) may register with the control plane device(s) 108. For instance, the border node 110(1) may register with the control plane device(s) 108 as a service ETR. Additionally, the border node 110(1) may register a security group tag with the control plane device(s) 108 that is to be assigned to traffic that is to be sent to the security service 118.

At 304, the border node 110(2) may register with the control plane device(s) 108. For instance, the border node 110(2) may register with the control plane device(s) 108 as a default ETR. Additionally, the border node 110(2) may register a security group tag with the control plane device(s) 108 that is to be assigned to any internet and/or external traffic that is to be sent through the border node 110(2).

At 306, the user device 106 may send a packet to the edge node 104. The packet may include an address prefix value associated with the external network device 114 and/or an external network in which the external network device 114 is located. At 308, based at least in part on receiving the packet, the edge node 104 may send a map-request message to the control plane device(s) 108. The map-request message may include an indication of the address prefix value of the external network device 114 to which the packet is to be sent.

Based at least in part on receiving the map-request message, at 310, the control plane device(s) 108 may send a map-reply message to the edge node 104. The map-reply message may indicate a routing locator identifier associated with the border node 110(2). Additionally, the map-reply message may indicate a security group tag that is associated with the border node 110(2) and/or the external network device 114. The security group tag may indicate that the external network device is an internet or other external destination. For instance, if the external network device 114 is an internet destination, the address prefix value will not be known by the control plane device(s) 108. However, instead of returning a negative map reply (NMR) message to the edge node 104 indicating that the address prefix is unknown, the control plane may determine that the address prefix value corresponds to an internet destination behind the border node 110 and, accordingly, assign the security group tag to the address prefix value that is part of the NMR "hole."

At 312, based at least in part on the security group tag included in the map-reply message from the control plane device(s) 108, the edge node 104 may apply a group-based steering policy in order to determine whether the user device 106 is authorized to send the packet to the external network device and, if so, under what conditions or circumstances. For instance, the edge node 104 may apply the policy to determine (i) whether to immediately drop the packet at the fabric edge node 104, (ii) whether to send the packet directly to the external network destination 114, or (iii) whether to send the packet to the external network destination 114 via a firewall or other security service.

At 314, based at least in part on applying the policy, the edge node 104 may determine that the user device 106 is authorized to send the packet to the external network device 114, but only if the packet is sent via the security service 118, and, accordingly, send the packet to the border node 110(1). After receiving the packet, the border node 110(1), at 316, forwards the packet to the security service 118. The security service 118 may then operate on the packet and then, at 318, send the packet back to the border node 110(1).

At 320, after receiving the packet from the security service, the border node may send a map-request message (e.g., LISP map-request) to the control plane device(s) 108 in order to determine the next hop for the packet. The map-request message may include an indication of the address prefix of the external network device 114. In response to receiving the map-request message, at 322 the control plane may send a map-reply message that includes a routing locator identifier of the border node 110(2) since that is the border in which the external network destination 114 is "behind."

At 324, after receiving map-reply message indicating the next-hop mapping data and routing locator identifier of the border node 110(2), the border node 110(1) may send the packet to the border node 110(2). And the border node 110(2), at 326, may forward the packet to the external network device 114.

FIG. 4 is a data flow diagram illustrating yet another example traffic flow 400 in which a group-based classification and policy decision is made for a packet and, in response, the packet is dropped and not sent to an external network device 114. At 402, the border node 110 may register with the control plane device(s) 108. For instance, the border node 110 may register with the control plane device(s) 108 as a default ETR or a service ETR. Additionally, the border node 110 may register a security group tag with the control plane device(s) 108 (e.g., with a LISP map-sever component of the control plane device(s) 108) that is to be assigned to any internet or external network traffic that is to be sent through the border node 110.

At 404, the user device 106 may send a packet to the edge node 104. The packet may include an address prefix value associated with the external network device 114 and/or an external network in which the external network device 114 is located. At 406, based at least in part on receiving the packet, the edge node 104 may send a map-request message (e.g., a LISP protocol map-request) to the control plane device(s) 108 (e.g., to a LISP map-resolver component of the control plane device(s) 108). The map-request message may include an indication of the address prefix value of the external network device 114 to which the packet is requested to be sent.

Based at least in part on receiving the map-request message, at 408, the control plane device(s) 108 (e.g., the LISP map-resolver component of the control plane device(s) 108) may send a map-reply message (e.g., LISP map-reply message) to the edge node 104. The map-reply message may indicate a routing locator identifier associated with the border node 110. Additionally, the map-reply message may indicate a security group tag that is associated with the border node 110 and/or the external network device 114. Additionally, the security group tag may indicate that the external network device comprises an internet or external destination not local to the network fabric.

At 410, based at least in part on the security group tag included in the map-reply message from the control plane device(s) 108, the edge node 104 may apply a group-based steering policy in order to determine whether the user device 106 is authorized to send the packet to the external network device 114 and, if so, under what conditions. For instance, the edge node 104 may apply the policy to determine (i) whether to immediately drop the packet at the fabric edge node 104, (ii) whether to send the packet directly to the external network destination 114, or (iii) whether to send the packet to the external network destination 114 via a firewall or other security service. At 412, based at least in part on applying the policy, the edge node 104 may determine to drop the packet at the fabric edge node 104.

FIG. 5 is a data flow diagram illustrating an example traffic flow 500 that may be performed in addition to the example traffic flows 200, 300, and 400 described in FIGS. 2-4, as well as other traffic flows described in this disclosure. The traffic flow 500 includes, among other devices and/or nodes, a controller 502 and a policy engine 504.

At 506, the controller may configure the border node 110. For instance, the controller 502 may configure the border node 110 as a service ETR, as shown, or as another type of ETR (e.g., default ETR), ITR, xTR, and the like. After configuration of the border node 110, the border node 110 may, at 508, register to the control plane device(s) 108. For instance, the border node 110 may register to the control plane device(s) 108 indicating that the border node 110 is configured as a service ETR. Additionally, or alternatively, the border node 110 may register a security group tag to the control plane that is to be assigned to traffic specific to a service in which the border node 110 provides connectivity to.

At 510, the edge node 104 may detect that a client device has connected to the edge node 104 (e.g., the client device has powered up or otherwise established a connection with the edge node 104). At 512, the edge node 104 may send a request to the policy engine 504. The request may be for the policy engine 504 to provide policy information associated with the connected client device and/or a user of the connected client device. Additionally, or alternatively, the request may be for the policy engine 504 to provide a security group tag associated with the client device or a user of the client device. In some instances, sending the request for the policy information may be partially responsive to detecting the client connection. At 514, the policy engine 504 may send the client policy to the edge node 104.

In some instances, the policy information associated with the client device and/or the user of the client device may indicate that some or all of outgoing packets sent by the client device are to be sent to the security service 118 (e.g., through a firewall). Accordingly, at 516 the edge node 104 may send a map-request message to the control plane device(s) 108. The map-request message may include a request for a routing locator identifier of a router that provides connectivity to the security service 118 (in this case, the border node 110). That is, the map-request message may be for the control plane device(s) 108 to provide an EID-to-RLOC mapping for the EID of the security service 118. At 518, the control plane device(s) 108 may send a map-reply message to the edge node 104, and the map-reply message may include the routing locator identifier of the border node 110. In this way, when the edge node 104 receives a packet from the client device, and the packet is to be routed through the security service 118, a map-request message is not necessary to determine the router locator identifier of the border node 110 in order to send the packet to the security service 118.

FIG. 6 is a block diagram illustrating example detail 600 of an example control plane device 108. As shown, the example control plane device 108 may include one or more processors 602 and computer-readable media 604 that is communicatively coupled to the one or more processors 602. The computer-readable media 604 of the control plane device 108 may store a map server component 606, a map resolver component 608, an EID-to-RLOC mappings database 610, a map registration table 612, and a border/service registration table 614. The computer-readable media 604 may store the components and databases shown in FIG. 6, as well as other components or databases not shown, as a set of instructions that, when executed by the one or more processors 602, cause the one or more processors 602 to perform the operations described herein.

In some examples, the map server component 606 may comprise a LISP map-server component. Additionally, in some instances, the map server component 606 may learn of address prefix mapping entries (e.g., EID prefix mappings) from an edge node or a border node of the fabric network (e.g., an ETR) via the registration processes described herein. The map server component 606 may also publish these address prefixes in the EID-to-RLOC mappings database 610. Additionally, the map server component 606 may learn of security group tags associated with respective edge nodes, border nodes, client devices, external network devices, services, etc. and publish these security group tags in either the map registration table 612 (for local, known fabric address prefixes) or in the border/service registration table 614 (for service specific, internet, or external address prefixes).

In some instances, the map resolver component 608 may comprise a LISP map-resolver component. Additionally, in some examples, the map resolver component 608 may accept map-request messages (e.g., LISP encapsulated map-requests) from an ingress router (e.g., the edge nodes 104 or the border nodes 110) and determine whether or not the destination IP address is part of the EID namespace (e.g., a local, known fabric destination). If the destination IP address is not part of the EID namespace, this may indicate that the destination is an internet or external destination, and the map resolver component 608 may consult the border/service registration table 612 in order to return a security group tag associated with internet or external traffic when sending a map-reply message back to the requesting ingress router. Otherwise, if the destination IP address is part of the EID namespace, the map resolver component 608 may find the appropriate EID-to-RLOC mapping by consulting the EID-to-RLOC mappings database 610, as well as the appropriate security group tag by consulting the map registration table 612, and return these to the requesting ingress router in a map-reply message.

In various examples, the EID-to-RLOC mappings database 610 may store multiple associations between respective EIDs and respective RLOCs. Additionally, in some examples, the map registration table 612 may store multiple associations between respective EIDs and respective security group tags assigned to those respective EIDs. The border/service registration table 614 may store multiple associations between security group tags and specific services, internet or external traffic, data center traffic, and/or the like. That is, for instance, the border/service registration table 614 may store information associated with border nodes (e.g., default ETRs and service ETRs), including security group tags associated with those border nodes.

Figure 7:
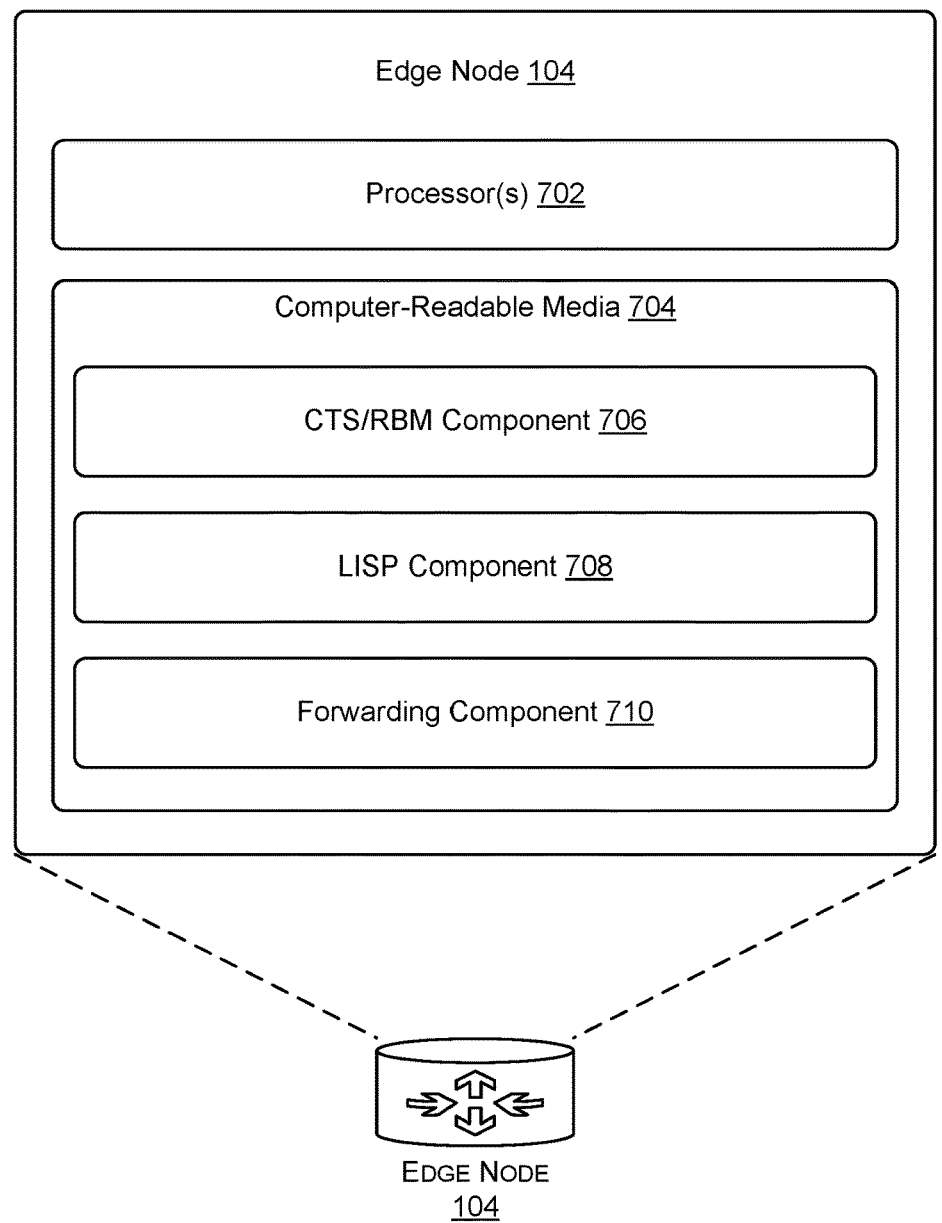
FIG. 7 is a block diagram illustrating example detail of an example edge node.

FIG. 7 is a block diagram illustrating example detail 700 of an example edge node 104. The edge node 104 may include one or more processors 702 and computer-readable media 704 that is communicatively coupled to the one or more processors 702. The computer-readable media 704 of the edge node 104 may store a CTS/RBM component 706, a LISP component 708, and a forwarding component 710. The computer-readable media 704 may store the components shown in FIG. 7, as well as other components not shown, as a set of instructions that, when executed by the one or more processors 702, cause the one or more processors 702 to perform the operations described herein.

The CTS/RBM component 706 may, among other things, be configured to detect when host devices connect to the edge node 104. Additionally, or alternatively, the CTS/RBM component 706 may be configured to send look-up or policy requests to a policy engine of the fabric network in order to determine policy information associated with the detected host devices or users of the detected host devices. Additionally, the CTS/RBM component 706 may receive RLOCs from the LISP component 708 of the edge node 104 and update the forwarding component 710 of the edge node 104 with these RLOCs.

The LISP component 708 of the edge node 104 may be configured to, in some examples, send LISP map-request messages to a service control plane LISP map-resolver component, as well as receive LISP map-reply messages from the service control plan LISP map-resolver component. The LISP component 708 may, additionally, send RLOCs included in LISP map-replies to the CTS/RBM component 706 of the edge node 104. Further, the LISP component 708 may cache security group tag information in the forwarding component 710.

The forwarding component 710 may store one or more ETR RLOCs and/or security group tags for sending packets to various destinations. Additionally, in some examples, the forwarding component may cache these ETR RLOCs and/or the security group tags for predetermined periods of time, and when the period of time has expired, the forwarding component may trigger the LISP component 708 to send LISP map-request messages to updated the ETR RLOCs and/or the security group tags.

FIG. 8 illustrates a logic flow diagram of an example method 800 associated with the technologies presented herein for, among other things, making group-based classification and policy decisions associated with sending packets to external destinations. The logical operations described herein with respect to FIG. 8 may be implemented (1) as a sequence of computer-implemented acts or program modules running on a computing system and/or (2) as interconnected machine logic circuits or circuit modules within a computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 8 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 800 begins at operation 802, which includes receiving, at a control plane of a network and from an edge node of the network, a request to provide mapping data associated with sending a packet to a destination, the request including an address prefix value that is associated with the destination. For instance, the control plane device 108 may receive a LISP map-request message that was sent by one of the edge nodes 104. Additionally, the address prefix value may be associated with one of the user devices 106(2), 106(N), or one of the external network devices 114.

At operation 804, the method 800 includes determining, by the control plane and based at least in part on the address prefix value, that the destination is located in an external network. For instance, the control plane device 108 may determine that the destination is located in the external network 116 based at least in part on determining that the address prefix value is associated with a negative map reply "hole" (e.g., the address prefix value is not stored in an EID-to-RLOC database as a local, known fabric address.

At operation 806, the method 800 includes determining a group identifier that is associated with a border node of the network, the group identifier indicating that the destination is located in the external network, the border node configured to route traffic between the network and the external network. For instance, the group identifier may comprise a security group tag that is associated with internet or external traffic that is routed through the border node 110(2) to be sent to the external network 116.

At operation 808, and based at least in part on determining that the destination is located in the external network, the method 800 includes sending an indication of the group identifier to the edge node such that the edge node determines, based at least in part on the group identifier, a policy decision for routing the packet. For example, instead of sending a negative map reply message to the edge node because the destination address prefix is not known, the control plane device 108 may send the indication of the group identifier in a LISP map-reply message. The LISP map-reply message may, in some instances, also include a RLOC that is associated with the border node 110(2).

Figure 9:
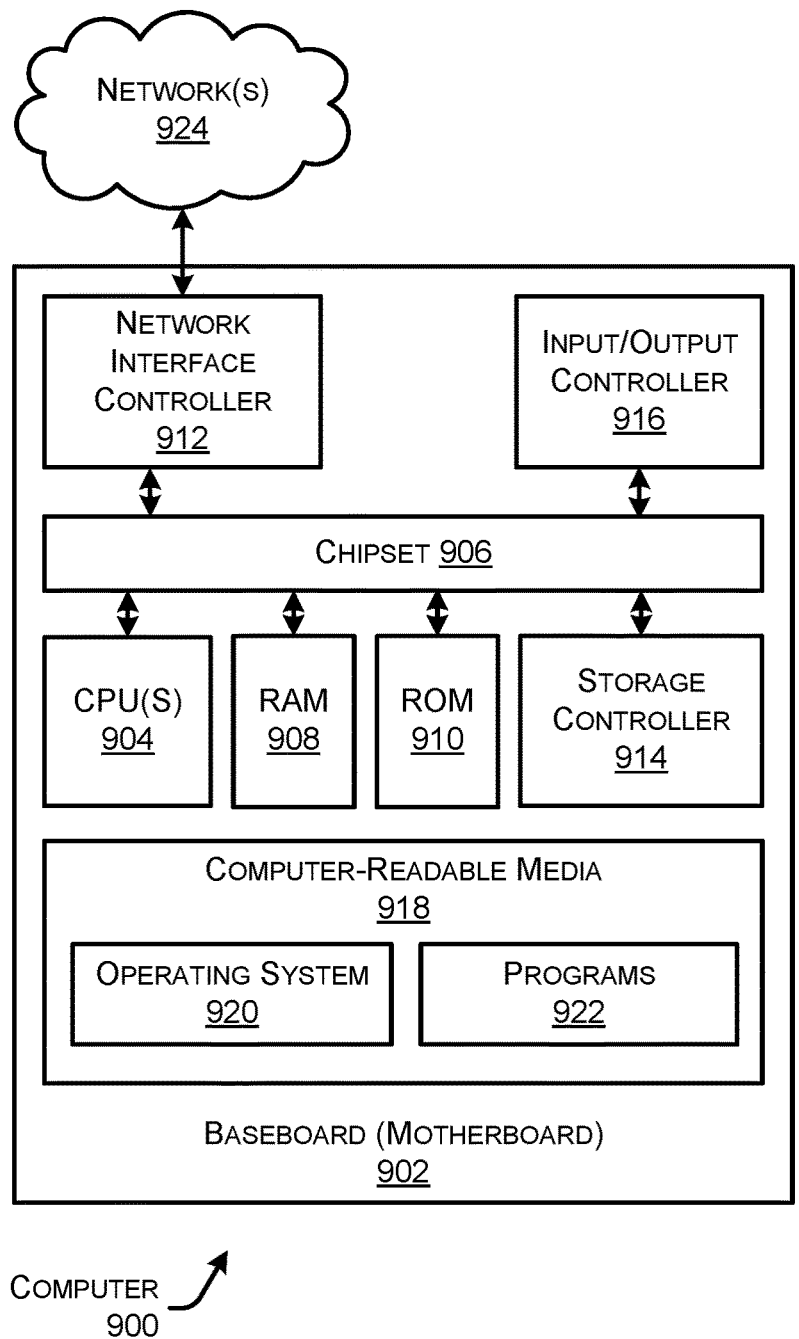
FIG. 9 illustrates a schematic view of an example computer-hardware architecture for implementing a network node and/or device, such as a control plane device, edge node, border node, etc. that can be utilized to implement aspects of the various technologies presented herein.

FIG. 9 illustrates a schematic view of an example computer-hardware architecture for implementing a network node and/or device, such as an edge node 104, a control plane device 108, and/or a border node 110, that can be utilized to implement aspects of the various technologies presented herein. The computer architecture shown in FIG. 9 illustrates a conventional server computer, router, network device, workstation, desktop computer, laptop, tablet, network appliance, e-reader, smartphone, and/or other computing device, and can be utilized to execute any of the software components presented herein. The computer 900 may comprise networked devices such as servers, switches, routers, hubs, bridges, gateways, modems, repeaters, access points, etc.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 909, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network fabric 102, the external network(s) 116, and/or the network(s) 924. The chipset 906 can include functionality for providing network connectivity through a NIC 912, such as a gigabit Ethernet adapter. The NIC 912 is capable of connecting the computer 900 to other computing devices over the network. It should be appreciated that multiple NICs 912 can be present in the computer 900, connecting the computer to other types of networks and remote computer systems. In some examples, the NIC 912 may be configured to perform at least some of the techniques described herein, and may include components for performing the techniques described herein.

The computer 900 can be connected to a computer-readable media 918 that provides non-volatile storage for the computer. The computer-readable media 918 can store an operating system 920, programs 922, and data, which have been described in greater detail herein. The computer-readable media 918 can be connected to the computer 900 through a storage controller 914 connected to the chipset 906. The computer-readable media 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the computer-readable media 918 by transforming the physical state of the physical storage units to reflect the information being stored. The specific transformation of physical state can depend on various factors, in different embodiments of this description. Examples of such factors can include, but are not limited to, the technology used to implement the physical storage units, whether the computer-readable media 918 is characterized as primary or secondary storage, and the like.

For example, the computer 900 can store information to the computer-readable media 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the computer-readable media 918 by detecting the physical states or characteristics of one or more particular locations within the physical storage units.

In addition to the computer-readable media 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900. In some examples, the operations performed by the system-architecture 100 and or any components included therein, may be supported by one or more devices similar to computer 900. Stated otherwise, some or all of the operations performed by the system-architecture 100, and or any components included therein, may be performed by one or more computer devices 900 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the computer-readable media 918 can store an operating system 920 utilized to control the operation of the computer 900. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The computer-readable media 918 can store other system or application programs and data utilized by the computer 900.

In one embodiment, the computer-readable media 918 or other computer-readable storage media is encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various processes described above with regard to FIGS. 1-7. The computer 900 can also include computer-readable storage media having instructions stored thereupon for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or might utilize an architecture completely different than that shown in FIG. 9.

As described herein, the computer 900 may comprise one or more of an edge node 104, a client device 106, a control plane device 108, a border node 110, an external network device 114, and the like. The computer 900 may include one or more hardware processors 904 (processors) configured to execute one or more stored instructions. The processor(s) 904 may comprise one or more cores. Further, the computer 900 may include one or more network interfaces (e.g., NIC 912) configured to provide communications between the computer 900 and other devices over a network, such as the network fabric 102, the external networks 116, and/or the networks 924. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 922 may comprise any type of programs or processes to perform the techniques described in this disclosure for integrating disparate headend traffic ingress services with disparate backend services, securely transiting traffic between networked computing environments, and more.

While the invention is described with respect to the specific examples, it is to be understood that the scope of the invention is not limited to these specific examples. For instance, while many of the examples are described with respect to specific protocols (e.g., LISP), it should be understood that the techniques described are applicable to other protocols. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   registering, at a control plane of a network, a border node that is configured to route traffic between the network and an external network;
   receiving, at the control plane and from an edge node of the network, a request to provide mapping data associated with sending a packet to a destination, the request including an address prefix value that is associated with the destination;
   determining, at the control plane and based at least in part on the address prefix value, that the destination is located in the external network;
   determining, at the control plane, a group identifier that is associated with the border node, the group identifier indicating that the destination is located in the external network; and
   sending, by the control plane and to the edge node, a reply to the request including an indication of the group identifier, the edge node configured to utilize the group identifier to determine a policy decision for routing the packet.

2. The method of claim 1, wherein determining the policy decision for routing the packet comprises determining, at the edge node, to:
   drop the packet;
   send the packet to the destination; or
   send the packet to the destination via a security service.

3. The method of claim 1, further comprising storing, at the control plane, mapping data comprising multiple known address prefix values associated with registered user devices of the network, each known address prefix value of the multiple known address prefix values being associated with a respective edge node of the network,
   wherein determining that the destination is located in the external network is based at least in part on the stored mapping data.

4. The method of claim 1, wherein sending the indication of the group identifier to the edge node further comprises sending a router identifier that is associated with the border node.

5. The method of claim 1, wherein the group identifier is cached by the edge node in a memory accessible to the edge node for a predetermined period of time.

6. The method of claim 1, wherein the destination comprises an internet destination and the group identifier indicates that the packet comprises internet traffic.

7. The method of claim 1, wherein registering the border node comprises associating the group identifier with the border node for address prefix values associated with a negative map reply (NMR) hole.

8. A system comprising:
   one or more processors; and
   one or more non-transitory computer-readable media storing instructions that, when executed by the one or more processors, cause the one or more processors to perform operations comprising:
      registering, at a control plane of a network, a border node that is configured to route traffic between the network and an external network;
      receiving, at the control plane and from an edge node of the network, a request to provide mapping data associated with sending a packet to a destination, the request including an address prefix value that is associated with the destination;
      determining, at the control plane and based at least in part on the address prefix value, that the destination is located in the external network;
      determining, at the control plane, a group identifier that is associated with the border node, the group identifier indicating that the destination is located in the external network; and
      sending, by the control plane and to the edge node, a reply to the request including an indication of the group identifier, the edge node configured to utilize the group identifier to determine a policy decision for routing the packet.

9. The system of claim 8, wherein determining the policy decision for routing the packet comprises determining, at the edge node, to:
   drop the packet;
   send the packet to the destination; or
   send the packet to the destination via a security service.

10. The system of claim 8, the operations further comprising storing, at the control plane, mapping data comprising multiple known address prefix values associated with registered user devices of the network, each known address prefix value of the multiple known address prefix values being associated with a respective edge node of the network, wherein determining that the destination is located in the external network is based at least in part on the stored mapping data.

11. The system of claim 8, wherein sending the indication of the group identifier to the edge node further comprises sending a router identifier that is associated with the border node.

12. The system of claim 8, wherein the group identifier is cached by the edge node in a memory accessible to the edge node for a predetermined period of time.

13. The system of claim 8, wherein the destination comprises an internet destination and the group identifier indicates that the packet comprises internet traffic.

14. The system of claim 8, wherein registering the border node comprises associating the group identifier with the border node for address prefix values associated with a negative map reply (NMR) hole.

15. One or more non-transitory computer-readable media storing instructions that, when executed by one or more processors, cause the one or more processors to perform operations comprising:

registering, at a control plane of a network, a border node that is configured to route traffic between the network and an external network;

receiving, at the control plane and from an edge node of the network, a request to provide mapping data associated with sending a packet to a destination, the request including an address prefix value that is associated with the destination;

determining, at the control plane and based at least in part on the address prefix value, that the destination is located in the external network;

determining, at the control plane, a group identifier that is associated with the border node, the group identifier indicating that the destination is located in the external network; and sending, by the control plane and to the edge node, a reply to the request including an indication of the group identifier, the edge node configured to utilize the group identifier to determine a policy decision for routing the packet.

16. The non-transitory computer-readable media of claim 15, wherein determining the policy decision for routing the packet comprises determining, at the edge node, to:

drop the packet;

send the packet to the destination; or send the packet to the destination via a security service.

17. The non-transitory computer-readable media of claim 15, the operations further comprising storing, at the control plane, mapping data comprising multiple known address prefix values associated with registered user devices of the network, each known address prefix value of the multiple known address prefix values being associated with a respective edge node of the network, wherein determining that the destination is located in the external network is based at least in part on the stored mapping data.

18. The non-transitory computer-readable media of claim 15, wherein sending the indication of the group identifier to the edge node further comprises sending a router identifier that is associated with the border node.

19. The non-transitory computer-readable media of claim 15, wherein the group identifier is cached by the edge node in a memory accessible to the edge node for a predetermined period of time.

20. The non-transitory computer-readable media of claim 15, wherein registering the border node comprises associating the group identifier with the border node for address prefix values associated with a negative map reply (NMR) hole.

* * * * *